United States Patent
Kim et al.

(10) Patent No.: US 11,662,837 B2
(45) Date of Patent: *May 30, 2023

(54) STYLUS PEN

(71) Applicant: HiDeep Inc., Seongnam-si (KR)

(72) Inventors: Seyeob Kim, Seongnam-si (KR); Hyoungwook Woo, Seongnam-si (KR); Kiryoung Jung, Seongnam-si (KR); Bonkee Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,933

(22) Filed: Mar. 15, 2022

(65) Prior Publication Data

US 2022/0206598 A1     Jun. 30, 2022

Related U.S. Application Data

(60) Division of application No. 17/193,177, filed on Mar. 5, 2021, now Pat. No. 11,301,062, which is a
(Continued)

(30) Foreign Application Priority Data

Feb. 14, 2019   (KR) ........................ 10-2019-0017373

(51) Int. Cl.
*G06F 3/0354* (2013.01)
*G06F 3/044* (2006.01)
(Continued)

(52) U.S. Cl.
CPC ........ *G06F 3/03545* (2013.01); *G06F 3/0441* (2019.05); *H01F 1/0315* (2013.01); *H01F 17/045* (2013.01)

(58) Field of Classification Search
CPC .. G06F 3/03545; G06F 3/0441; H01F 17/045; H01F 27/2823; H01F 1/0315
See application file for complete search history.

(56) References Cited

U.S. PATENT DOCUMENTS

2005/0162411 A1   7/2005   Berkel van
2010/0176817 A1*  7/2010   McLean ................. H01F 38/28
                                                        336/221
(Continued)

FOREIGN PATENT DOCUMENTS

JP      56-035686       9/1982
JP      2005529414      9/2005
(Continued)

OTHER PUBLICATIONS

EPO, Search Report of EP 20755963.4 dated Aug. 19, 2022.
(Continued)

*Primary Examiner* — Muhammad N Edun
(74) *Attorney, Agent, or Firm* — Lex IP Meister, PLLC

(57) ABSTRACT

An exemplary embodiment of the present invention provides a stylus pen including: a body; a conductive tip configured to be exposed from an inside of the body to an outside thereof; and a resonance circuit connected to the conductive tip to resonate an electrical signal transferred from the conductive tip. An inductor unit of the resonance circuit includes a ferrite core and a coil wound in multiple layers over at least a portion of the ferrite core. The ferrite core includes nickel, and the coil can be formed by a litz wire with adjacent winding layers that are wound to be inclined in a zigzag form.

20 Claims, 17 Drawing Sheets

Related U.S. Application Data continuation of application No. 16/790,853, filed on Feb. 14, 2020, now Pat. No. 10,942,587.

(51) Int. Cl.
*H01F 17/04* (2006.01)
*H01F 1/03* (2006.01)

(56) References Cited

U.S. PATENT DOCUMENTS

| | | | |
|---|---|---|---|
| 2011/0115753 A1* | 5/2011 | Katsurahira | G06F 3/03545 178/19.03 |
| 2012/0223917 A1 | 9/2012 | Lin | |
| 2014/0132529 A1* | 5/2014 | Jeong | G06F 3/0442 345/173 |
| 2014/0320445 A1 | 10/2014 | Kim | |
| 2015/0084935 A1 | 3/2015 | Lien | |

FOREIGN PATENT DOCUMENTS

| | | |
|---|---|---|
| JP | 3171524 | 11/2011 |
| JP | 2013-162113 | 8/2013 |
| JP | 2014-219959 | 11/2014 |
| JP | 2016-134512 | 7/2016 |
| JP | 2017-211753 | 11/2017 |
| WO | 2002089157 | 11/2002 |

OTHER PUBLICATIONS

Radu-Marian Cernat: "Transient modeling of coaxial coil systems taking into account nonlinear material properties", Aug. 6, 2013 (Aug. 6, 2013), pp. 1-119, XP055950024, DOI: 10.17877/de290r-5510.

* cited by examiner

STYLUS PEN

CROSS-REFERENCE TO RELATED APPLICATION

This application is a Continuation Application of U.S. patent application Ser. No. 16/790,853 filed on Feb. 14, 2020, which claims priority to and benefits of Korean Patent Application No. 10-2019-0017373, filed in the Korean Intellectual Property Office on Feb. 14, 2019, the entire contents of which are incorporated herein by reference.

BACKGROUND OF THE INVENTION

(a) Field of the Invention

The present disclosure relates to a stylus pen.

(b) Description of the Related Art

Various terminals such as mobile phones, smart phones, tablet PCs, laptop computers, digital broadcasting terminals, PDAs (personal digital assistants), PMPs (portable multimedia players), and navigation devices include touch sensors.

In such a terminal, a touch sensor may be disposed on a display panel displaying an image, or may be disposed in an area of a terminal body. As a user interacts with the terminal by touching the touch sensor, the terminal may provide the user with an intuitive user interface.

The user may use a stylus pen for sophisticated touch input. The stylus pen may be classified into an active stylus pen and a passive stylus pen depending on whether a battery and an electronic component are provided therein.

The active stylus pen may have better basic performance as compared with the passive stylus pen and provide additional functions (pen pressure, hovering, and buttons), but the pen itself is expensive and requires a power source to charge the battery, so there are not many users except for some advanced users.

The passive stylus pen is inexpensive and requires no battery compared to the active stylus pen, but has difficult touch recognition as compared to the active stylus pen. However, recently, techniques of an inductive resonance type of an EMR (Electro Magnetic Resonance) method and a capacitive resonance method have been proposed in order to implement a passive stylus pen capable of sophisticated touch recognition.

The EMR method is superior in writing/drawing quality, which is a key feature of the stylus pen, but is thicker and more expensive since a separate EMR sensor panel and an EMR driving IC must be added in addition to the capacitance touch panel.

The capacitive resonance method uses a general capacitance touch sensor and a touch controller IC to support the pen touch by increasing the performance of the IC without additional cost.

In the capacitive resonance method, the amplitude of a resonance signal must be large for the touch sensor to more accurately identify the touch by the stylus pen, and thus a frequency of the driving signal transferred from the touch sensor to the stylus pen is almost equal to a resonance frequency of a resonance circuit built in the stylus pen. However, depending on the conventional capacitive resonance method, even when the resonance frequency and the frequency of the drive signal coincide with each other, attenuation of signal transmission becomes very large due to very small capacitance formed between a touch sensor that outputs the drive signal and a pen tip that receives the drive signal, thereby making signal transmission difficult. As a result, despite a long attempt by many touch controller IC vendors, there are no companies that have succeeded in mass production because sufficient output signals are not obtained.

Therefore, how to design the internal resonance circuit and pen structure is a very important factor in manufacturing capacitive resonant stylus pens that can produce maximum output signals.

The above information disclosed in this Background section is only for enhancement of understanding of the background of the invention and therefore it may contain information that does not form the prior art that is already known in this country to a person of ordinary skill in the art.

SUMMARY OF THE INVENTION

The present exemplary embodiments have been made in an effort to provide a capacitive resonant stylus pen capable of generating sufficient output signals.

For achieving the objects or other objects, an exemplary embodiment of the present invention provides a stylus pen including:

a body; a conductive tip configured to be exposed from an inside of the body to an outside thereof; an inductor unit including a ferrite core disposed in the body and a coil connected to the conductive tip and wound in multiple layers over at least a portion of the ferrite core; and a capacitor unit disposed in the body to be electrically connected to the inductor unit to form a resonance circuit.

Herein, the ferrite core may have permittivity of 1000 F/m or less, and the coil has a form where adjacent winding layers are alternately wound, and the coil is a wire covering two or more insulated wires.

In addition, the ferrite core may include nickel, and the coil may be formed of a litz wire.

It may further include a ground portion that can be electrically connected to the user, it may further include a bobbin surrounding at least a portion of the ferrite core, and the coil may be wound over at least a portion of the bobbin.

It may further include a conductive blocking member configured to surround at least a portion of the resonance circuit. The blocking member may include one slit for blocking generation of eddy currents, and opposite ends of the blocking member may be spaced apart by the slit in a first direction in which an eddy current is formed.

Another exemplary embodiment of the present invention provides a stylus pen including: a body; a conductive tip configured to be exposed from an inside of the body to an outside thereof; a resonance circuit disposed in the body to be connected to the conductive tip and to resonate an electrical signal transferred from the conductive tip; and a ground portion configured to be capable of being electrically connected to a user.

Herein, the resonance circuit may include: an inductor unit configured to include a ferrite core disposed in the body and a coil electrically connected to the conductive tip and wound in multiple layers over at least a portion of the ferrite core; and a capacitor unit disposed within the body to be electrically connected to the ground portion and the conductive tip. In this case, the ferrite core may have permittivity of 1000 F/m or less, the coil is zigzag wound so that adjacent winding layers are inclined, and the coil may be a wire covering two or more insulated wires.

In addition, the ferrite core may include nickel, and the coil may be formed of litz wire.

In this case, the resonance circuit may be formed to include two or more inductor units and one capacitor unit connected in series. In addition, the resonance circuit may include two or more LC resonance circuits that are connected in series.

It may further include a conductive blocking member configured to surround at least a portion of the resonance circuit. The blocking member may include one slit for blocking generation of eddy currents, and opposite ends of the blocking member may be spaced apart by the slit in a first direction in which an eddy current is formed.

The effects of the stylus pen according to the present disclosure will be described as follows.

According to at least one of the exemplary embodiments of the present disclosure, a sufficient output signal may be generated even with a thin diameter by presenting the structure of the resonance circuit of the optimal capacitive resonant stylus pen.

According to at least one of the exemplary embodiments of the present disclosure, it is possible to provide a stylus pen that is robust against external factors.

The additional range of applicability of the present disclosure will become apparent from the following detailed description. However, since various modifications and alternatives within the spirit and scope of the present disclosure may be clearly understood by those skilled in the art, it is to be understood that a detailed description and a specific exemplary embodiment of the present invention are provided only by way of example.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

In addition, unless explicitly described to the contrary, the word "comprise" and variations such as "comprises" or "comprising" will be understood to imply the inclusion of stated elements but not the exclusion of any other elements. When referring to a part as being "on" or "above" another part, it may be positioned directly on or above the other part, or another part may be interposed therebetween. In contrast, when referring to a part being "directly above" another part, no other part is interposed therebetween.

Figure 1:
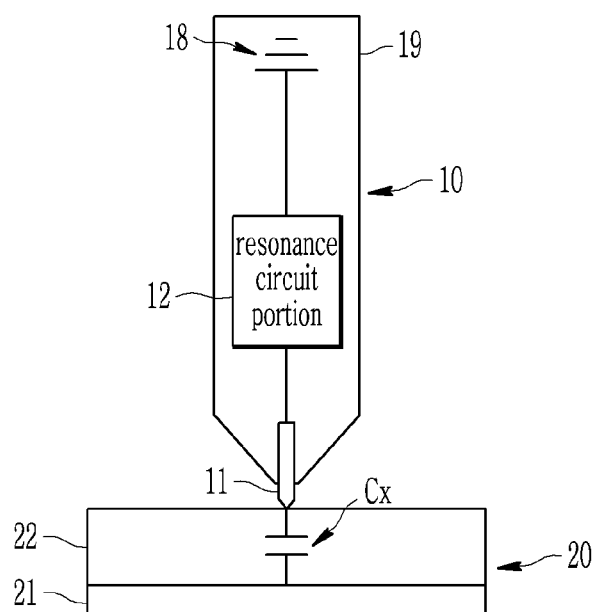
FIG. 1 illustrates a schematic view showing a stylus pen and a touch sensor.

FIG. 1 illustrates a schematic view showing a capacitive resonant stylus pen and a touch sensor. As illustrated in FIG. 1, a stylus pen 10 and a touch sensor 20 may be close to each other.

The stylus pen 10 may include a conductive tip 11, a resonance circuit 12, a ground portion 18, and a body 19.

The conductive tip 11 is connected with the resonance circuit 12. All or part of the conductive tip 11 may be formed of a conductive material (e.g., a metal, graphite, a conductive rubber, a conductive fabric, a conductive silicon, etc.). In addition, the conductive tip 11 may have a form in which a portion of the conductive tip 11 is exposed to an outside of a non-conductive housing while being present inside the non-conductive housing, but it is not limited thereto.

The resonance circuit 12 may resonate with a driving signal that is inputted from the touch sensor 20. For example, the resonance circuit 12 may be an LC resonance circuit, and may resonate with a driving signal that is received from the touch sensor 20 through the conductive tip 11. The driving signal may be a Tx signal that is transferred to the touch electrode (channel). For example, the driving signal may include a signal (e.g., a sine wave, a square wave, etc.) having a frequency corresponding to the resonance frequency of the stylus pen 10 so as to allow the stylus pen 10 to generate a resonance signal by capacitive coupling or electromagnetic resonance.

The resonance circuit 12 may output a resonance signal caused by resonance to the conductive tip 11 during a period in which a driving signal is inputted and during a partial period thereafter. The resonance circuit 12 is disposed in the body 19 to be connected to the ground portion 18. The ground portion 18 may be grounded by a body of a user who contacts an outer surface of the body 19.

The body 19 may accommodate elements of the stylus pen 10. In FIG. 1, the body 19 is illustrated in a form in which a horn portion and a pillar portion are integrally combined, but the two portions may be separated. It may have a cylindrical shape, a polygonal shape, a column shape having at least part of a shape of a curved surface, an entasis, a frustum of a pyramid, a circular truncated cone, or the like, but it is not limited thereto. Since the body 19 is empty inside, the body 19 may accommodate the conductive tip 11, the resonance circuit 12, and the ground portion 18 therein.

The touch sensor 20 may include a channel electrode 21 and a window 22 disposed at an upper portion of the channel electrode 21. The channel electrode 21, the conductive tip 11, and the window 22 may constitute capacitor Cx.

Figure 2:
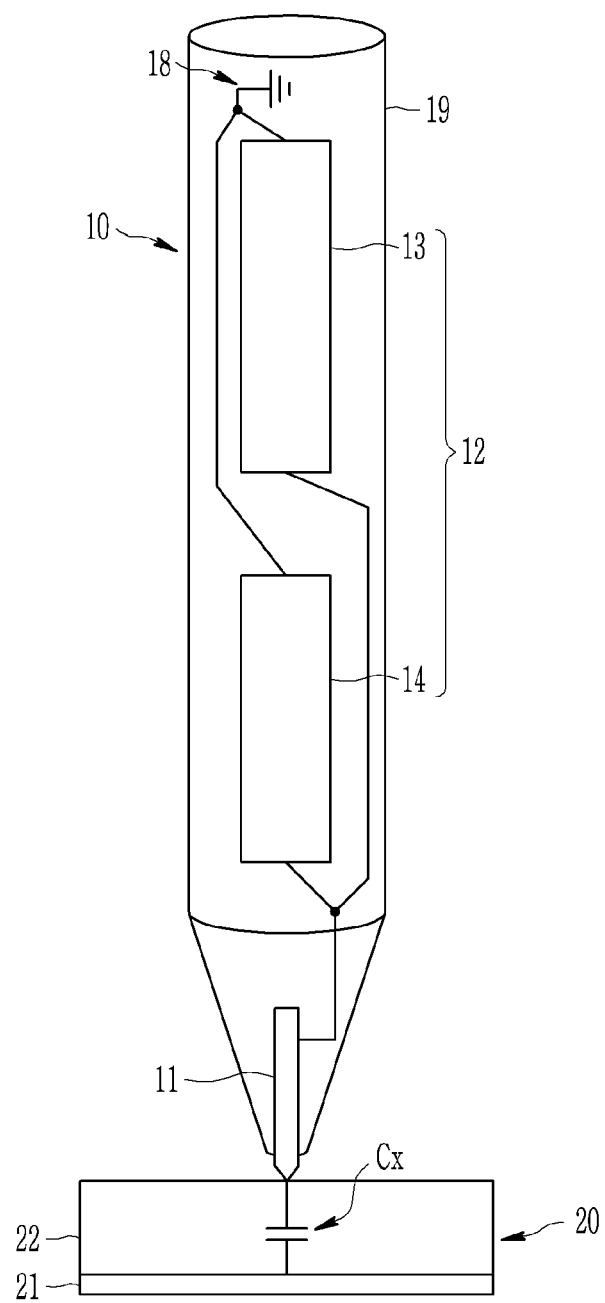
FIG. 2 illustrates a stylus pen and a touch sensor in detail.

FIG. 2 illustrates a schematic view showing a stylus pen and a touch sensor in detail.

First, as illustrated in FIG. 2, the stylus pen 10 includes a conductive tip 11, a capacitor unit 13, an inductor unit 14, a ground portion 18, and a body 19. The capacitor unit 13 and the inductor unit 14 constitute the resonance circuit 12 of FIG. 1.

The conductive tip 11 may be connected to the capacitor unit 13 and/or the inductor unit 14 through a conductive connection member, and the conductive connecting member may be a wire, a pin, a rod, a bar, or the like, but it is not limited thereto. In addition, the conductive connection member may include a coil of the inductor unit 14.

The capacitor unit 13 may include a plurality of capacitors connected in parallel. The capacitors may have different capacitances, and may be trimmed in a manufacturing process.

The inductor unit 14 may be disposed adjacent to the conductive tip 11. The inductor unit 14 includes a ferrite core and a coil that is wound around the ferrite core.

Figure 3:
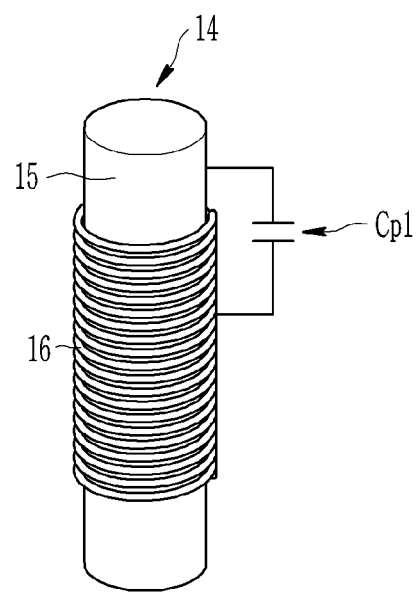
FIG. 3 illustrates an inductor unit of the stylus pen in detail.

The capacitor unit 13 and the inductor unit 14 are connected in parallel, and a resonance signal is generated in response to a driving signal through LC resonance of the capacitor unit 13 and the inductor unit 14. FIG. 3 illustrates a schematic view showing an inductor unit of a stylus pen in detail.

Referring to FIG. 3, the inductor unit 14 includes a ferrite core 15 and a coil 16 that is wound around the ferrite core 15.

In this case, the inductance of the inductor unit 14 is determined by the following Equation 1.

$$L = \frac{\mu S N^2}{l} \quad \text{(Equation 1)}$$

As can be seen from Equation 1, the inductance is proportional to the permeability of the ferrite core 15, a cross-sectional area of the coil 16, and a square of a number of turns, and is inversely proportional to a winding length of the coil 16.

Figure 4:
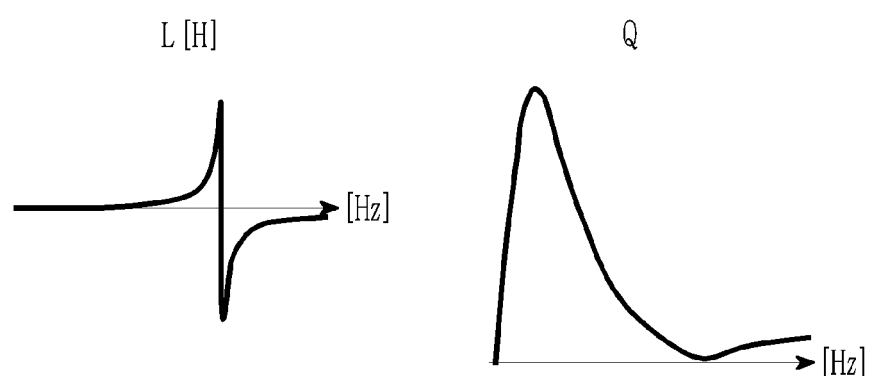
FIG. 4 illustrates inductance and Q values depending on frequency changes.

A design of the inductor unit 14 is very important in the resonance circuit 12 accommodated in the capacitive resonant stylus pen. In particular, in the design of the inductor unit, inductance L and a Q value are very important parameters as illustrated in FIG. 4. Herein, the Q value is an amount representing a coil characteristic as a resonance circuit element, and is given by an equation $Q=2\pi f L/R$. In addition, L and R indicate the inductance and resistance of the coil, respectively, and f indicates the frequency. The higher the Q value, the sharper the resonance characteristic.

In the design of the capacitive resonant stylus pen, L may have a sufficiently large self-resonance frequency relative to a frequency to be used, and the Q value may have a maximum at a frequency to be used. To satisfy this, it is necessary to optimize a material of the ferrite core, a wire type of the coil, and a winding scheme. There is also a need for a method that can obtain a high output signal while maintaining the diameter of a thin pen.

In the following exemplary embodiments, a design method of a capacitive resonant stylus pen that is most optimized among materials of a plurality of ferrite cores, wire types of coils, and a winding scheme will be described.

1. Ferrite Core Material

In an example, manganese (Mn) and nickel (Ni) were used as a ferrite core material.

2. Wire Type

In the example, an enameled wire and a litz wire were used as the wire type of the coil used.

Figure 5:
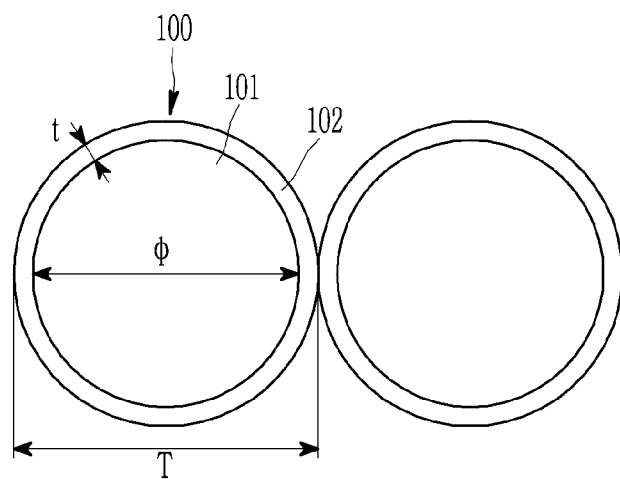
FIG. 5 and FIG. 6 respectively illustrate an enamel wire and a litz wire.

As illustrated in FIG. 5, an enameled wire 100 is an electric wire made by coating an insulating enamel 102 on a surface of a copper wire 101 and heating it to a high temperature, and is used for winding and wiring of electrical devices, communication devices, and electrical instruments. In the example, an enameled wire having a total thickness T of 0.2 mm, an electric wire diameter Φ of 0.18 mm, and a coating thickness t of 0.01 mm was used.

Figure 6:
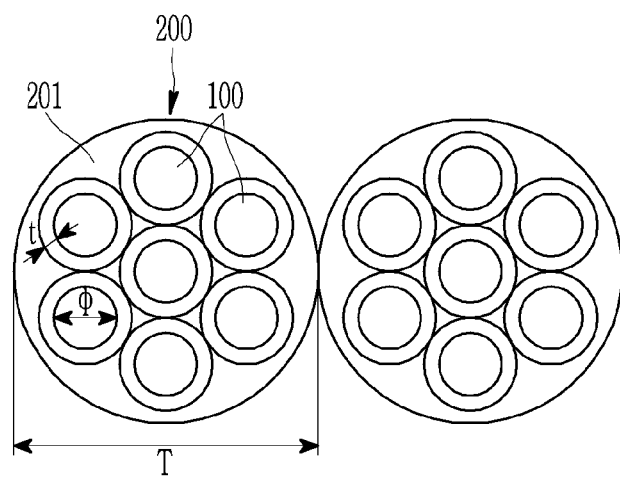

As illustrated in FIG. 6, a litz wire 200 is a special insulated wire that is made by twisting several strands of a thin insulated wire 100 (e.g., an enameled wire) having a diameter of about 0.1 mm as one wire and applying an insulating coating 201 made of nylon or the like thereon. The litz wire 200 may reduce a skin effect by increasing a surface area, and is used for coils of high frequency circuits and the like.

In the example, a litz wire having a total thickness T of 0.2 mm, an electric wire diameter Φ of 0.06 mm, and a covering thickness t of 0.007 mm was used.

3. Winding Scheme

In the example of the present invention, a winding scheme of a multilayer winding structure is used in order to obtain a sufficient inductance value (that is, a sufficient number of turns) in a limited space of a stylus pen. Specifically, as shown in FIG. 7A and FIG. 7B, two kinds of multi-layer winding schemes were used.

Figure 7A:
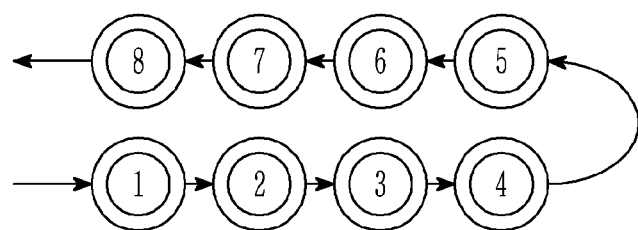
FIG. 7A and FIG. 7B illustrate a multi-layer winding method.

The winding scheme of FIG. 7A is a simplest winding scheme, and is a sequential layer winding scheme in which an upper layer is wound after winding of a lower layer that is disposed immediately therebelow is finished. In this case, the scheme of FIG. 7A is a scheme in which winding of a layer starts at a point where winding of a previous layer that is disposed immediately therebelow ends, and is hereinafter referred to as a U-type winding scheme.

Figure 7B:
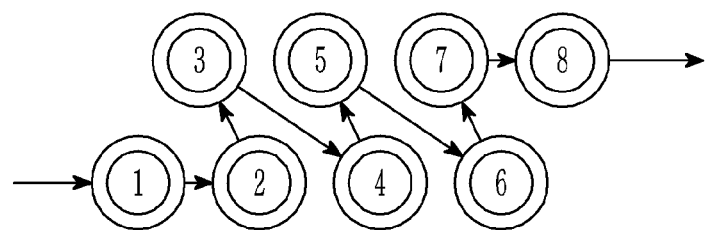

The winding scheme of FIG. 7B is an alternate layer winding scheme in which adjacent winding layers are alternately wound, such that windings of adjacent layers are wound in a zigzag form. Hereinafter, this is referred to as a zigzag winding scheme. This zigzag winding scheme may minimize a voltage difference between the windings of adjacent layers, thereby reducing winding self-capacitance. In this case, the winding self-capacitance, which is a kind of parasitic capacitance, is a parameter representing electric field energy stored in the winding.

Comparative Experiment 1 (Comparison of Characteristic Values for Each Material

A material of the ferrite core was changed to manganese, nickel, and magnesium, and the Q value was measured in a state where an enameled wire was used as a wire type of coil and was wound by a U type of winding scheme.

As a result of the measurement, there was little difference between the characteristics of the Q values for each material of cores, and a measured Q value was not enough to be implemented as a product.

Comparative Experiment 2 (Comparison of Characteristic Values for Each Type of Windings)

Q values were respectively measured for the Inductors 1 and 2 produced using the enameled wire and the litz wire in a state in which the ferrite core was wound with manganese (Mn) by the U type of winding scheme.

Figure 8:
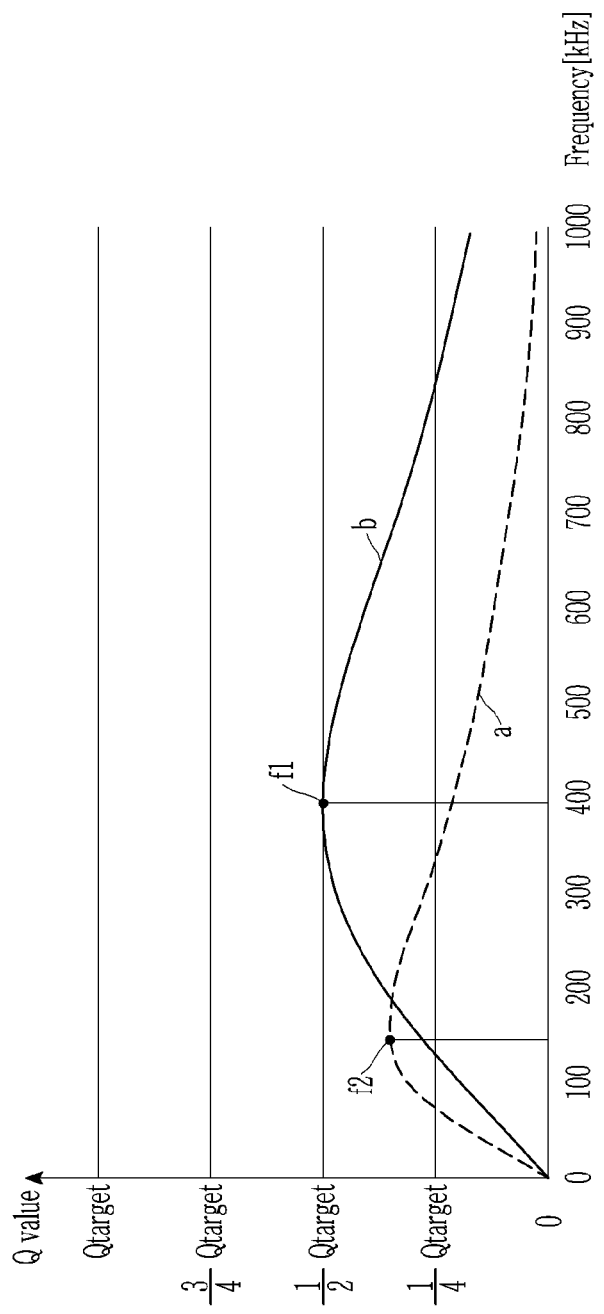
FIG. 8 to FIG. 10 illustrate graphs showing results of comparative experiments.

FIG. 8 illustrates Q values of Inductors 1 and 2 measured while changing frequencies through an E4980A precision LCR meter manufactured by KEYSIGHT TECHNOLOGIES.

In FIG. 8, a indicates a waveform showing a change in the Q value with respect to the frequency of Inductor 1 (manganese core/enameled wire/U-type winding scheme), and b indicates a waveform showing a change of the Q value with respect to the frequency of the Inductor 2 (manganese core/litz wire/U-type winding scheme).

The Q value has almost a maximum at a frequency (frequency f1) around 400 kHz in the Inductor 2 manufactured by the Litz wire, and the Q value has almost a maximum at a frequency (frequency f2) around 150 kHz in the Inductor 1 manufactured by the enameled wire.

As a result of comparing a and b of FIG. 8, it can be seen that the maximum Q value of the Inductor 2 is about 1.5 times higher than the maximum Q value of the Inductor 1. Accordingly, it can be seen that the litz wire is superior to the enameled wire as the coil of the inductor forming the resonance circuit of the stylus pen.

However, the maximum Q value of Inductor 2 measured in Comparative Experiment 2 was about ½ of a target value $Q_{target}$ required for commercialization.

Comparative Experiment 3 (Comparison of Characteristic Values for Each Winding Scheme)

Q values were measured for the inductors 3 to 5 manufactured by changing the wire type to the enameled wire and the litz wire and the winding scheme to the U type and the zigzag type in a state where the ferrite core was made of manganese (Mn).

Figure 9:
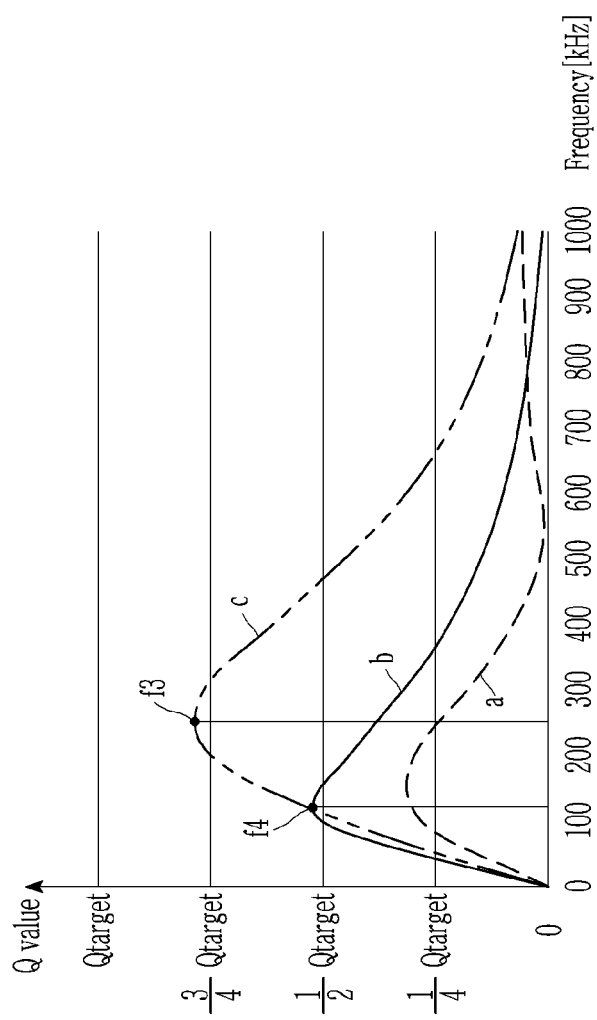

FIG. 9 illustrates Q values of Inductors 3 to 5 measured while changing frequencies through an E4980A precision LCR meter manufactured by KEYSIGHT TECHNOLOGIES.

In FIG. 9, a indicates a waveform showing a change in the Q value with respect to the frequency of Inductor 3 (manganese core/enameled wire/U-type winding scheme), b indicates a waveform showing a change of the Q value with respect to the frequency of Inductor 4 (manganese core/enameled wire/zigzag winding scheme), and c indicates a waveform showing a change of the Q value with respect to the frequency of Inductor 5 (manganese core/litz wire/zigzag winding scheme)

As can be seen from the waveform c of FIG. 9, the Q value has almost a maximum at a frequency (frequency f3) around 300 kHz in Inductor 5 manufactured by the litz wire/zigzag winding scheme. The Q value has almost a maximum at a frequency (frequency f2) around 150 kHz in Inductor 4 manufactured by the enameled wire/zigzag winding scheme and Inductor 3 manufactured by the enameled wire/U-type winding scheme.

In addition, as a result of comparing a, b, and c of FIG. 9, it can be seen that the maximum Q value of Inductor 5 is about 1.5 times higher than the maximum Q value of the Inductor 4 and is twice or more higher than the maximum Q value of Inductor 3. Accordingly, it can be seen that the zigzag type is superior to the U-type as the winding scheme of the inductor forming the resonance circuit of the stylus pen.

However, the maximum Q value of Inductor 5 (manganese core/litz wire/zigzag winding scheme) measured in Comparative Experiment 2 was about ¾ of a target value $Q_{target}$ required for commercialization.

Comparative Experiment 4 (Comparison of Characteristic Values for Each Core Material)

In this example, manganese and nickel were used as a ferrite core material, and it is known that permeability of nickel is generally 200-300, and the permeability of manganese is generally 3000-5000.

Since the manganese used in this example is approximately 15 times higher in permeability than nickel, assuming that the coils have same cross-sectional area and length, the number of turns of manganese is reduced by approximately four times that of nickel to obtain the same inductance value. Accordingly, only from the viewpoint of the number of turns, it can be seen that is more effective to use manganese than nickel.

On the other hand, since the inductor unit 14 has a complicated structure including a coil wound around the core, parasitic capacitance is additionally generated. Since the Q value decreases due to such parasitic capacitance, an amplitude of the resonance signal may be reduced.

The parasitic capacitance generated in the inductor unit 14 may occur between the wound coils and between the core and the coil, and as described above, the parasitic capacitance between the wound coils may be reduced by adopting the zigzag winding scheme.

Meanwhile, in this example, a core material having lower permittivity than that of manganese was tested in order to reduce the parasitic capacitance between the core and the coil, and the test result confirmed that the nickel core was an optimal material for the ferrite core.

An important physical property in manganese and nickel, which are mainly used as a ferrite core element, is permeability, which has an important effect on an inductance value as shown in Equation 1. However, in manganese and nickel as ferrite elements, the permittivity is a physical property of little concern, and in fact, nickel does not have relevant information in the data sheet provided by the manufacturer.

In this example, the permittivity of manganese and nickel was measured using E4980A precision LCR meter of KEYSIGHT TECHNOLOGIES in order to confirm the permittivity of manganese and nickel, and the measurement results are shown in Table 1 below.

TABLE 1

|  | Manganese permittivity | Nickel permittivity |
| --- | --- | --- |
| Measurement 1 | 2400 | — |
| Measurement 2 | 8300 | 2 |

Measurements 1 and 2 were measured using the same E4980A precision LCR meter of KEYSIGHT TECHNOLOGIES, where Measurement 1 represents the permittivity that is automatically calculated by measurement software. According to Measurement 1, although the permittivity of manganese is 2400, the permittivity of nickel is not measured.

Measurement 2 is a method of calculating the dielectric constant by measuring capacitance, area, and distance between ferrite cores, and according to Measurement 2, the permittivity of manganese is 8300 and the permittivity of nickel is 2.

There is a big difference in the result of permittivity between Measurement 1 and Measurement 2, and in the case of Measurement 2, it was confirmed that errors were considerable depending on capacitance, area, distance, and the like. However, as results of Measurement 1 and Measurement 2, it can be seen that nickel has permittivity of at least ¹⁄₁₀₀₀ or more relative to manganese.

In Comparative Experiment 4, Q values were measured for Inductors 6 and 7 manufactured by changing the winding type to the U type and the zigzag type with the ferrite core made of nickel and using the litz wire as the wire type.

Figure 10:
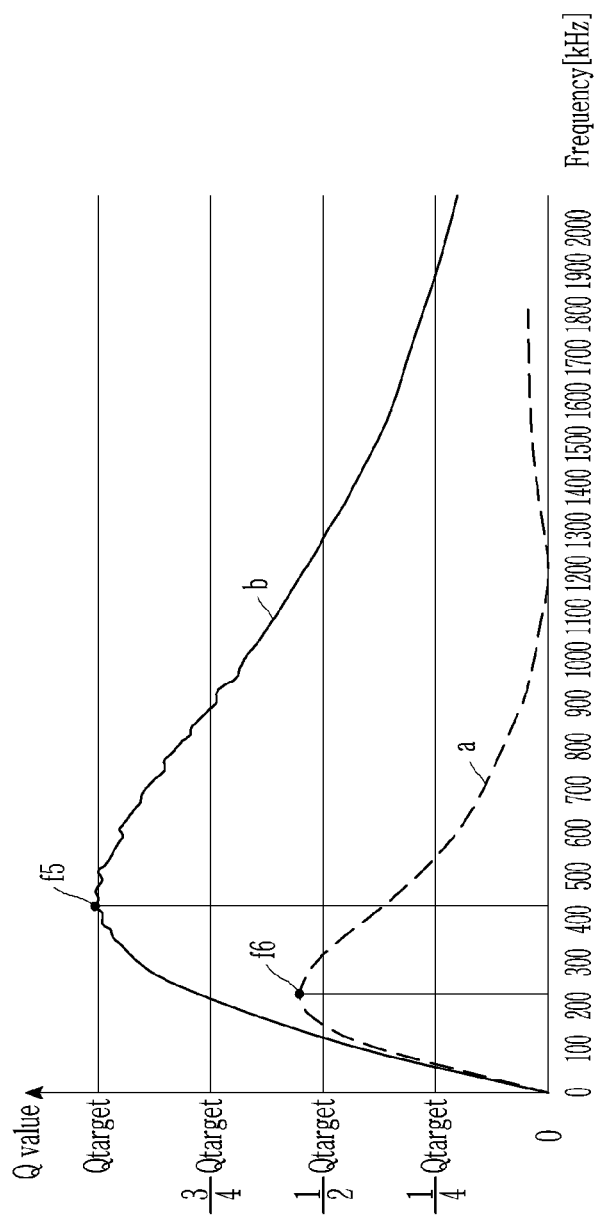

FIG. 10 illustrates Q values of Inductors 6 and 7 measured while changing frequencies through an E4980A precision LCR meter manufactured by KEYSIGHT TECHNOLOGIES.

In FIG. 9, a indicates a waveform showing a change in the Q value with respect to the frequency of Inductor 6 (nickel core/litz wire/U-type winding scheme), and b indicates a waveform showing a change of the Q value with respect to the frequency of the Inductor 7 (nickel core/litz wire/zigzag winding scheme).

As can be seen from the waveform b of FIG. 10, the Q value has almost a maximum at a frequency (frequency f5) around 400 kHz in Inductor 7 manufactured by the nickel core/litz wire/zigzag winding scheme. The Q value has almost a maximum at a frequency (frequency f6) around 200kHz in Inductor 6 manufactured by the nickel core/litz wire/U-type winding scheme. As a result of comparing a and b of FIG. 11, it can be seen that the maximum Q value of Inductor 7 is about two times higher than the maximum Q value of Inductor 6.

The maximum Q value of Inductor 7 (nickel core/litz wire/zigzag winding scheme) measured in Comparative Experiment 4 almost reaches a target value $Q_{target}$ required for commercialization.

In Comparative Experiments 1 to 4 described above, inductors were manufactured and tested for Q values by changing the material of the ferrite core, the wire type of the coil, and the winding scheme, and test results show that the highest Q value is obtained when the inductor unit of the capacitive resonant stylus is designed by winding of the nickel core, the litz wire, and the zigzag winding scheme. In addition, it can be seen that the maximum Q value of the inductor manufactured by this combination reaches the target value $Q_{target}$ for commercialization.

Meanwhile, in the present exemplary embodiment, the nickel core is used as the ferrite core and the litz wire is used as the wire type of the core, but similar results may be obtained when a material with permittivity of 1000 or less is used as the ferrite core instead of the nickel core, and a single wire wrapped with two or more insulated strands is used instead of the litz wire.

In the present exemplary embodiment, as described below, a method of increasing the distance between the core and the coil by providing a bobbin between the core and the coil may be used in order to further reduce the parasitic capacitance between the core and the coil, in addition to using nickel having lower permittivity than manganese.

Figure 11:
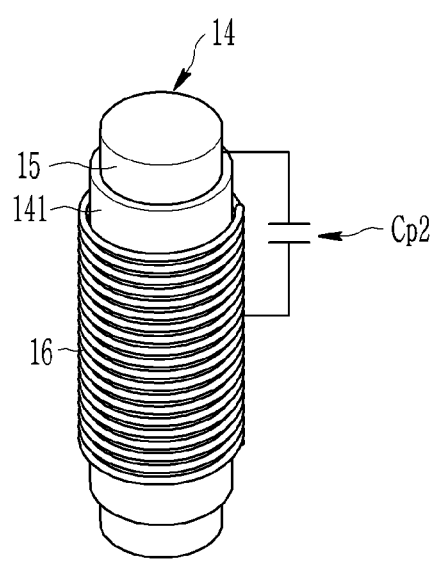
FIG. 11 illustrates another example of the inductor unit.

Referring to FIG. 11, the inductor unit 14 includes a ferrite core 15, a bobbin 141 surrounding at least a portion of the ferrite core 15, and a coil 16 wound on at least a portion of the bobbin 141. The bobbin 141 may be fixed by being closely adhered to the ferrite core 15 by a force caused by the winding of the coil 16. The bobbin 141 may include the same material as that of the body 19 or a different material, and may include, e.g., a plastic or metal having an insulating surface. Specifically, polyphenylene sulfide (PPS), liquid crystalline polyester (LCP), polybutylene terephthalate (PBT), polyethylene terephthalate (PET), a phenolic resin, or the like may be used for the bobbin 141.

As such, when the bobbin 141 covers the ferrite core 15 and the bobbin 141 is wound as the coil 16, a distance between the ferrite core 15 and the coil 16 increases, so that a value of a parasitic capacitance Cp2 in FIG. 11 may be set to be smaller than a value of a parasitic capacitance Cp1 in FIG. 3.

Figure 12:
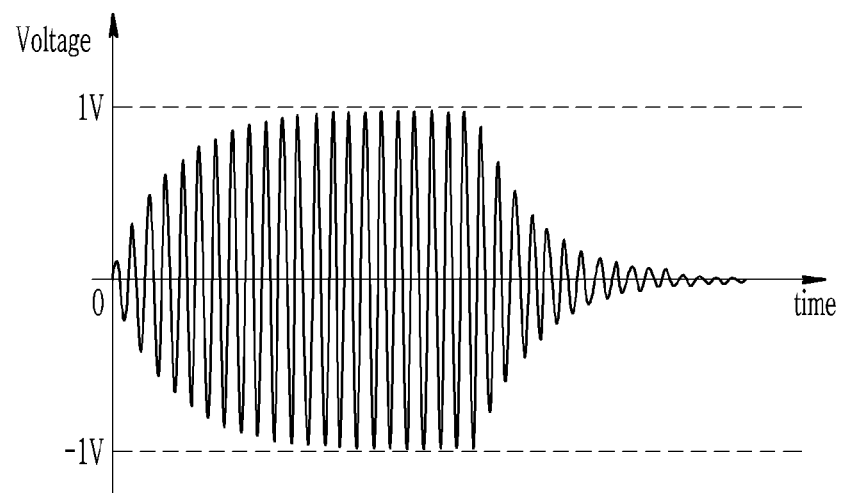
FIG. 12 and FIG. 13 are graphs illustrating the magnitude of a resonance signal depending on the structure of the inductor unit.
Figure 13:
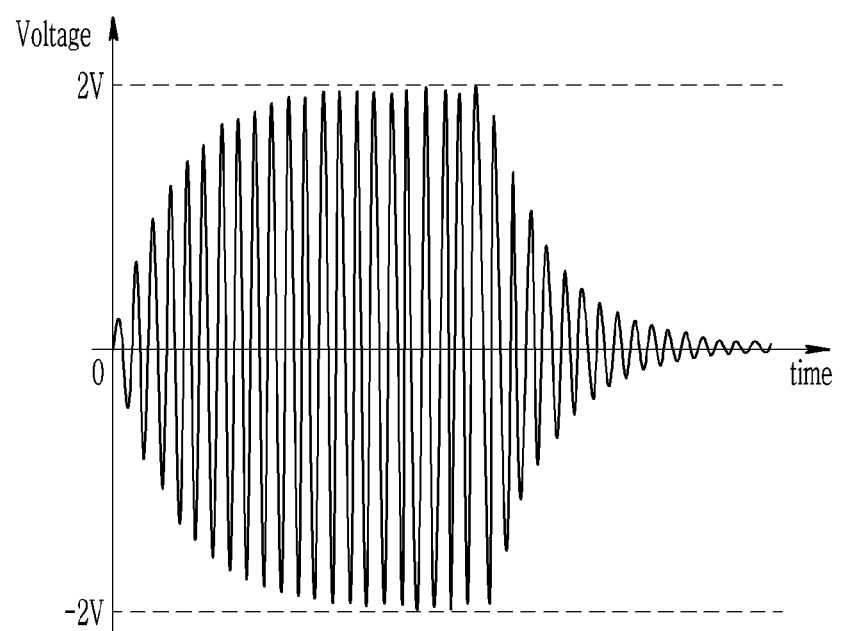

Referring to FIG. 12, when the inductor unit 14 includes only the ferrite core 15 and the coil 16, a maximum amplitude of the resonance signal is measured to be about 2 V (+1 V to −1 V). Referring to FIG. 13, when the inductor unit 14 includes the ferrite core 15, the bobbin 141, and the coil 16, the maximum amplitude of the resonance signal is measured to be about 4 V (+2 V to −2 V). That is, when at least a portion of the ferrite core 15 is surrounded in the bobbin 141 and the coil 16 is wound on the bobbin 141, it is confirmed that the amplitude of the resonance signal is larger.

Meanwhile, in the case of using nickel as the ferrite core to design the optimum inductor unit according to the present exemplary embodiment, as described above, nickel has a 1/15 times lower permeability than manganese, and thus the number of turns of nickel must be increased to approximately four times that of manganese to achieve the same inductance. Accordingly, the nickel must be larger in diameter than manganese to achieve the same inductance as manganese.

In the present exemplary embodiment, a method of using a plurality of inductors is proposed to achieve a high output signal while reducing a diameter of the stylus pen.

Figure 14:
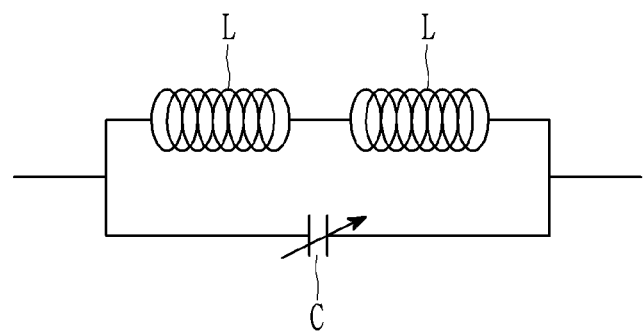
FIG. 14 and FIG. 15 illustrate other examples of the resonance circuit.

FIG. 14 illustrates an equivalent circuit in which two inductors of thin diameter are connected in series and a capacitor is connected in parallel between opposite ends of the two inductors. Hereinafter, this type of resonance circuit is referred to as an 'LLC resonance circuit'. In FIG. 14, it is illustrated that two inductors are connected in series, but the exemplary embodiment is not limited thereto, and three or more inductors may be connected in series. According to the LLC resonance circuit, since the inductance L is twice as large as that of the resonance circuit having one inductor and capacitor (hereinafter referred to as an 'LC resonance circuit'), the capacitance may be reduced to half. That is, the LLC resonance may be made to be thinner than the LC resonance circuit, but is more sensitive to an influence on the capacitance.

Figure 15:
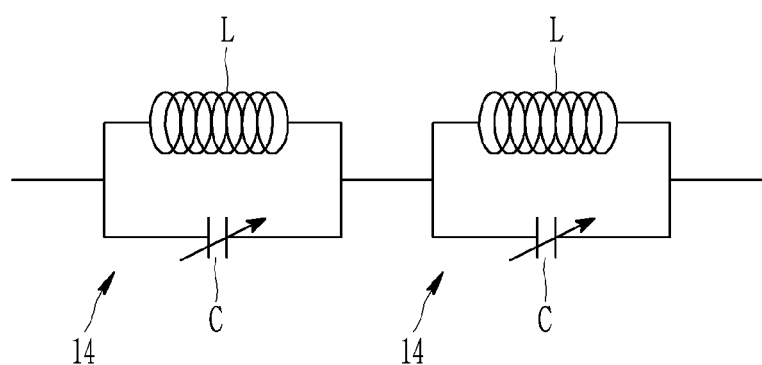

Meanwhile, FIG. 15 illustrates an equivalent circuit in which two LC resonance circuits are connected in series (hereinafter referred to as an "LCLC resonance circuit"), where two resonance signals are combined and outputted. In FIG. 15, it is illustrated that two LC resonance circuits are connected in series, but the exemplary embodiment is not limited thereto, and three or more LC resonance circuits may be connected in series.

According to the LCLC resonance circuit, since resonance frequencies of the two resonance circuits must be the same, the resonance frequency of each resonance circuit must be tuned to be the same in a manufacturing process.

As described above, in spite of an increase in the number of windings generated by using nickel as a ferrite core, when two or more inductors are used as illustrated in FIG. 14 and FIG. 15, a stylus pen having a thin diameter may be manufactured by suppressing an increase in the diameter of the inductor unit.

Meanwhile, as illustrated in FIG. 14, when the LLC resonance circuit is used, a stylus pen having a structure described in the following may be adopted to minimize an effect on the capacitance reduced by half.

In FIG. 2, the stylus pen 10 is held by a user's finger or the like, and in this case, parasitic capacitance Cf may be formed by a finger and an internal conductor (coil or capacitor) of the stylus pen 1.

Figure 16:
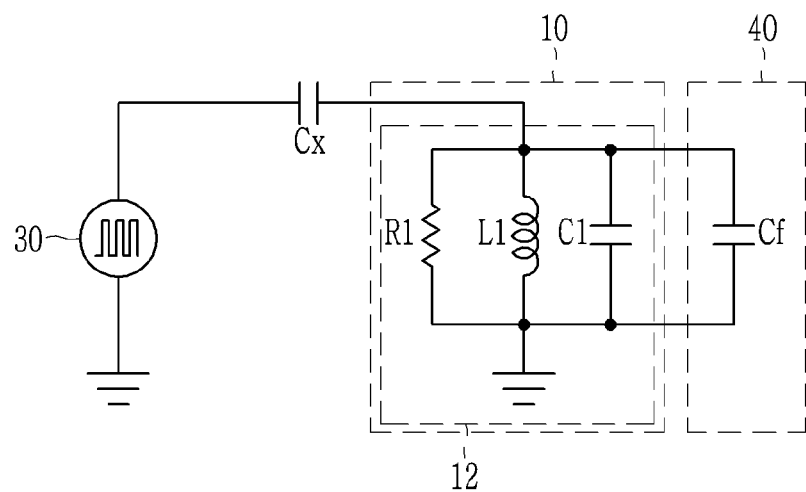
FIG. 16 illustrates an equivalent circuit showing an effect of parasitic capacitance of a user's hand.

FIG. 16 illustrates an equivalent circuit showing an effect of the parasitic capacitance Cf by a user's hand. Referring to FIG. 16, a resonance frequency of the stylus pen 10 is changed by the parasitic capacitance Cf (40). Then, a frequency of the driving signal 30 and a resonance frequency of the stylus pen 10 do not coincide, and thus a magnitude of the signal that is outputted from the stylus pen 10 decreases. In this case, an influence of the parasitic capacitance Cf (40) is greater in the LLC circuit illustrated in FIG. 14 than in the LC resonance circuit or the LCLC resonance circuit. This is because, when designed with the same resonance frequency, capacitance of the LLC resonance circuit is ½ smaller than that of the LC resonance circuit or the LCLC resonance circuit.

Hereinafter, a stylus pen for preventing a change in resonance frequency due to a user's grip will be described with reference to FIG. 17.

Figure 17:
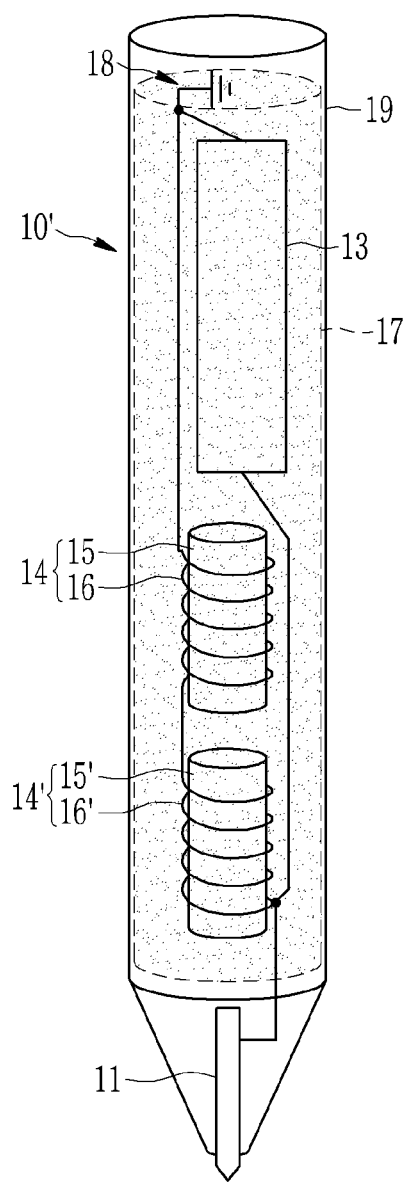
FIG. 17 illustrates a schematic view showing a stylus pen of an LLC structure.

FIG. 17 illustrates a schematic view showing a stylus pen of an LLC structure.

As illustrated in FIG. 17, the stylus pen 10 includes a conductive tip 11, a capacitor unit 13, two inductor units 14 and 14', a blocking member 17, a ground portion 18, and a body 19.

The inductor units 14 and 14' include ferrite cores 15 and 15' and coils 16 and 16' wound around the ferrite cores 15 and 15', respectively. In this case, the two inductor units 14 and 14' are connected in series.

The blocking member 17, which is a conductive member surrounding the capacitor unit 13 and the inductor units 14 and 14', may prevent parasitic capacitance from being generated by a user's hand.

In this case, the blocking member 17 may be designed such that opposite ends of the blocking member 17 may be spaced apart along a direction ED of an eddy current in order to minimize an influence of the eddy current generated in the stylus pen.

In this regard, the blocking member 17 will be described in detail with reference to FIG. 18A to FIG. 18D.

As illustrated in FIG. 17, a clockwise current flows through the coils 16 and 16' by a driving signal transferred from the conductive tip 11, and a magnetic field is generated by the currents flowing through the coils 16 and 16'. In this case, an eddy current is generated in a counterclockwise direction that is opposite to the current direction of the coils by a change in the magnetic field generated by the currents of the coils, and thus the eddy current in the counterclockwise direction flows in the blocking member 17.

Figure 18A:
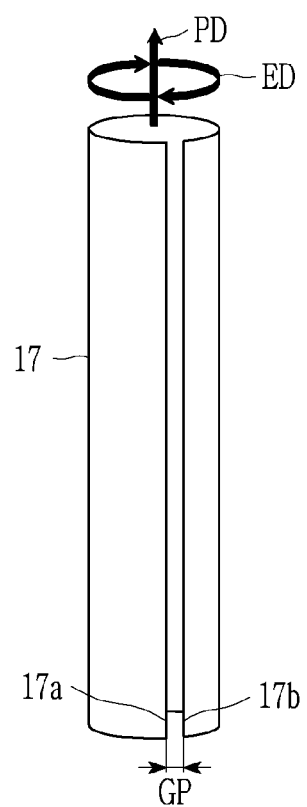
FIG. 18A to FIG. 18D illustrate various examples of a blocking member.

Referring to FIG. 18A, the blocking member 17 includes one slit GP for blocking generation of eddy currents. The slit GP extends along a direction PD that is perpendicular to the eddy current (counterclockwise in FIG. 18). Opposite ends 17a and 17b of the blocking member 17 are spaced apart by the slit GP. In exemplary embodiments, the slit GP may have a width of 0.03 mm or more along the direction ED of the eddy current.

Although the slit GP has been described as extending along the direction PD that is perpendicular to the eddy current, the slit GP may extend along the direction inclined at a predetermined angle (more than 0 degrees and less than 90 degrees) to the direction PD. The opposite ends 17a and 17b of the blocking member 17 are spaced apart along the direction ED of the eddy current. Accordingly, since the eddy current cannot flow along the blocking member 17, generation of the eddy current is interrupted.

Figure 18B:
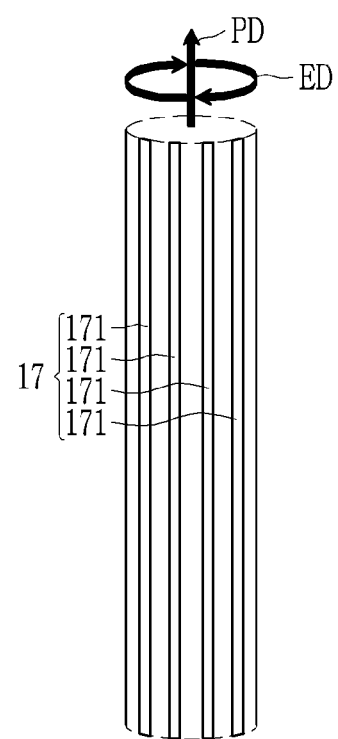

Referring to FIG. 18B, the blocking member 17 includes a plurality of first blocking units 171. The first blocking units 171 extend along the direction PD that is perpendicular to the eddy current, and are spaced apart from each other along the direction ED of the eddy current. Similarly, since the blocking member 17 includes the plurality of first blocking units 171 spaced apart from each other along the direction ED of the eddy current, no eddy current can flow along the blocking member 17, thereby blocking the generation of the eddy current. Although the first blocking units 171 have been described as extending along the direction PD that is perpendicular to the eddy current, the first blocking units 171 may extend along the direction inclined at a predetermined angle (more than 0 degrees and less than 90 degrees) to the direction PD.

Figure 18C:
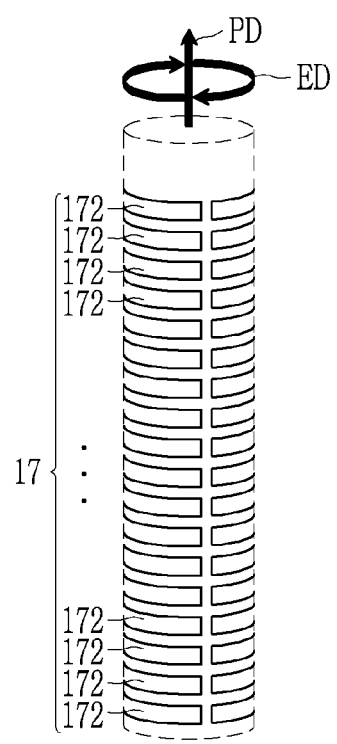

Referring to FIG. 18C, the blocking member 17 includes a plurality of second blocking units 172. The second blocking units 172 are spaced apart along the direction PD that is perpendicular to the eddy current, and opposite ends of each of the second blocking units 172 are spaced apart from each other along the direction ED of the eddy current. Similarly, since the opposite ends of each of the second blocking units 172 included in the blocking member 17 are spaced along the direction ED of the eddy current, no eddy current can flow along the blocking member 17, thereby blocking the generation of the eddy current.

Figure 18D:
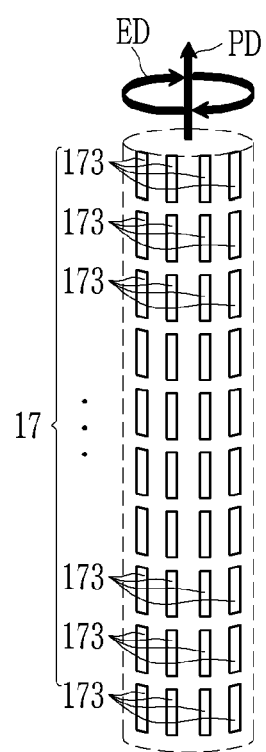

Referring to FIG. 18D, the blocking member 17 includes a plurality of third blocking units 173. The third blocking units 173 are spaced apart from each other along the direction PD that is perpendicular to the eddy current and the direction ED of the eddy current. Similarly, since the third blocking units 173 included in the blocking member 17 are spaced along the direction ED of the eddy current, no eddy current can flow along the blocking member 17, thereby blocking the generation of the eddy current.

Although the present exemplary embodiment has been described above, the above detailed description should not be construed as limiting in all aspects and should be considered as illustrative. The scope of the present invention should be determined by reasonable interpretation of the appended claims, and all changes within the equivalent range of the present invention are included in the scope of the present invention.

DESCRIPTION OF SYMBOLS 10 stylus pens, 11 conductive tip, 12 resonance circuit, 13 capacitor unit 14 inductor unit, 15 ferrite core, 16 coil, 17 blocking element, 18 ground portion 19 body, 20 touch sensor, 30 driving signal, 40 parasitic capacitance, 100 enameled wire 101 copper wire, 102 enamel, 141 bobbin, 200 litz wire, 201 insulating coating

What is claimed is:

1. A stylus pen comprising:
   a body;
   a tip configured to be exposed from an inside of the body to an outside of the body;
   an inductor unit including a ferrite core disposed in the body and a coil wound in multiple layers over at least a portion of the ferrite core; and
   a capacitor unit disposed in the body to be electrically connected to the inductor unit to form a resonance circuit, and
   wherein a permittivity of the ferrite core is greater than 0 F/m and less than 1000 F/m.

2. The stylus pen of claim 1,
   wherein the coil has a form where adjacent winding layers are alternately wound.

3. The stylus pen of claim 1, wherein
   the coil is zigzag wound so that adjacent winding layers are inclined.

4. The stylus pen of claim 1, wherein
   the ferrite core includes nickel.

5. The stylus pen of claim 1, wherein
   the coil is a wire covering two or more insulated wires.

6. The stylus pen of claim 5, wherein
   the coil is formed as a litz wire.

7. The stylus pen of claim 1, further comprising
a bobbin configured to surround at least a portion of the ferrite core, and
the coil is wound on at least a portion of the bobbin.
8. The stylus pen of claim 1, wherein
the inductor unit includes two or more inductor that are connected in series.
9. The stylus pen of claim 1, wherein
the inductor unit includes a plurality of inductors and the capacitor unit includes a plurality of capacitors,
a first resonance circuit includes a first inductor of the plurality of inductors and a first capacitor of the plurality of capacitors,
a second resonance circuit includes a second inductor of the plurality of inductors and a second capacitor of the plurality of capacitors, and
the first resonance circuit and the second resonance circuit are connected in series.
10. The stylus pen of claim 1, further comprising
a blocking member disposed on at least a portion of the inductor unit.
11. A stylus pen comprising:
a body;
a tip configured to be exposed from an inside of the body to an outside of the body; and
a resonance circuit disposed in the body,
wherein the resonance circuit includes:
an inductor unit configured to include a ferrite core disposed in the body and a coil wound in multiple layers over at least a portion of the ferrite core; and
a capacitor unit disposed within the body,
wherein a permittivity of the ferrite core is greater than 0 F/m and less than 1000 F/m.
12. The stylus pen of claim 11, wherein
the ferrite core includes nickel.
13. The stylus pen of claim 11, wherein
the coil is a wire covering two or more insulated wires.
14. The stylus pen of claim 13, wherein
the coil is formed as a litz wire.
15. The stylus pen of claim 11, further comprising
a bobbin configured to surround at least a portion of the ferrite core, and
the coil is wound on at least a portion of the bobbin.
16. The stylus pen of claim 11, wherein
the resonance circuit is formed to include two or more inductor and one capacitor unit connected in series.
17. The stylus pen of claim 11, wherein
the resonance circuit includes two or more LC resonance circuits that are connected in series.
18. The stylus pen of claim 11, wherein
The coil is zigzag wound so that adjacent winding layers are inclined.
19. The stylus pen of claim 11, wherein
the resonance circuit is configured to resonate a signal transferred from an external electrode.
20. The stylus pen of claim 11, further comprising
a blocking member disposed on at least a portion of the inductor unit.

\* \* \* \* \*